Oct. 30, 1973  L. NINANE  3,769,391
PROCESS FOR REPLENISHING ACTIVE ELEMENTS OF MOBILE
BED GRANULAR MASSES IN THE PRODUCTION OF CHLORINE
Filed April 13, 1971
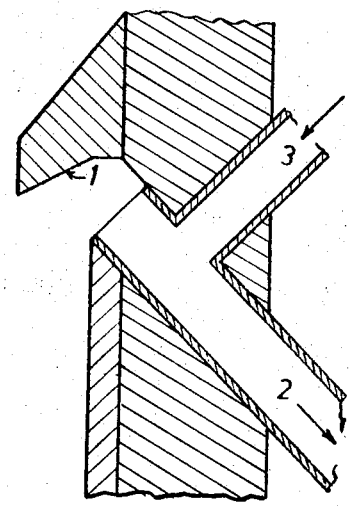
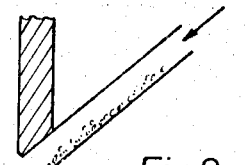
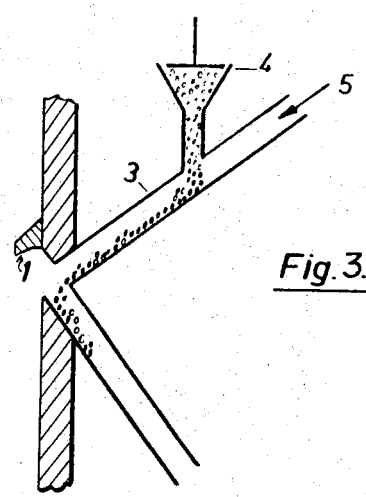
INVENTOR.
Leon Ninane
BY *Spencer & Kaye*
ATTORNEYS.

United States Patent Office 3,769,391
Patented Oct. 30, 1973

3,769,391
PROCESS FOR REPLENISHING ACTIVE ELEMENTS OF MOBILE BED GRANULAR MASSES IN THE PRODUCTION OF CHLORINE
Léon Ninane, Bierges, Belgium, assignor to Solvay & Cie, Brussels, Belgium
Filed Apr. 13, 1971, Ser. No. 133,593
Claims priority, application Belgium, Apr. 28, 1970, 88,369
Int. Cl. C01b 7/02
U.S. Cl. 423—502                              4 Claims

ABSTRACT OF THE DISCLOSURE

In a reaction process for the production of chlorine from hydrogen chloride and/or ammonium chloride employing active elements contained in granular masses forming a mobile bed which moves downwardly through reaction zones and in which a proportion of the granular masses are removed continuously from the top of the bed, cooled, and returned to the masses leaving the bottom of the bed so as to maintain the thermal equilibrium of the system, a method for replenishing the active elements of the masses by cooling the withdrawn proportion to below 200° C., continuously delivering to the withdrawn masses, while their temperature is below 200° C., a solution containing such active elements, and regulating the rate of delivery of solution to maintain it at least equal to the rate of loss of the active elements from the totality of masses moving in the bed.

BACKGROUND OF THE INVENTION

The present invention relates to a process for replenishing the active elements of granular masses flowing under the influence of gravity in a mobile bed.

Granular masses, catalytic or reactive, constituted by an inert support impregnated with active elements and passing in a cyclic manner through one or several reaction chambers are utilized for effectuating, generally at an elevated temperature of at least 300° C., numerous chemical reactions. Examples of such reactions are catalytic cracking, isomerization, hydrogenation, dehydrogenation, aromatization, chlorination and dehydrochlorination.

It is also well known to utilize such masses flowing in a mobile bed to fabricate chlorine from hydrogen chloride and/or ammonium chloride. Such processes are described particularly in U.S. Pats. Nos. 3,384,456; 3,383,177; and 3,332,742.

It is also known that in all of the mobile bed processes, the granular masses become impoverished in the active ingredients over a period of time and that it is thus desirable to replenish them.

This improverishment can be due to an erosion of the surface layer of the granules, which layer is the richest in active elements, but also due to the evaporation of certain salts, particularly ferric chloride, which is an essential active ingredient of masses intended for the fabrication of chlorine from hydrogen chloride and/or ammonium chloride. In this latter case in particular, it has been noted that the losses in iron could reach 5 to 6%, by weight, after three days of continuous operation.

Such a loss in active elements not only reduces the quantity of gas which can be treated, but also modifies the relative proportion of the various active ingredients, which in the end results in a reduction in the concentration of the chlorine produced.

Therefore, a need exists for a simple and effective means to replenish such masses.

In order to avoid the inconveniences of the standard re-impregnation procedure for achieving such replenishment, which procedure requires completely emptying the reactors, it has already been proposed, in U.S. Pat. No. 3,342,557, to inject, into the mobile bed, active ingredients in a finely divided state and either in their active form or in a form capable of conversion into the active form in a zone, or immediately before a zone, where the active ingredients impregnating the granular masses are in the form of a paste. When this process is applied to the replenishment of iron, copper and potassium in granular masses utilized for the fabrication of chlorine from hydrogen chloride and/or ammonium chloride, these elements are then dispersed in the form of a powder on the slope of a mound of granules which forms at the top of the oxidation zone. This process, although effective, can however provoke blockages in the oxidation zone.

SUMMARY OF THE INVENTION

It is a primary object of the present invention to avoid such drawbacks and difficulties.

Another object of the invention is to provide an improved method for replenishing the active elements of a granular mass of the type discussed above.

A further object of the invention is to prevent blockages of the oxidation zone in reactors of the type described above.

These and other objects of the invention are achieved by a novel method for replenishing the active elements of granular masses employed in a process involving causing the masses to flow, under the influence of gravity, in a mobile bed through a plurality of superposed reaction zones from which gas currents escape, then returning the masses to the top of the bed, continuously withdrawing a portion of the masses from the top of the bed, causing the withdrawn portion to flow along a path outside the bed, from the top to the bottom of the bed, bringing the withdrawn portion into contact with a gaseous curren leaving one of the reaction zones as that portion travels along such path, combining the withdrawn masses reaching the end of such path with the masses leaving the bottom of the bed, and returning the combined masses to the top of the bed. The method according to the invention is carried out by cooling the withdrawn granular masses at a point along such path to a temperature below 200° C., delivering into contact with the cooled masses, when their temperature is below 200° C., and outside of the region where they are initially brought into contact with the gaseous current, an aqueous solution of the active elements, and maintaining the rate of delivery of such solution at a value which is a funciton of the concentration of the active elements therein for causing the quantity of active elements supplied by the solution per hour to be at least equal to the quantity of active elements lost per hour by the totality of granular masses passing through the plurality of superposed reaction zones.

It is important that the granular masses at the time of replenishment be at a temperature below 200° C. Above this temperature, it has been observed that the contact between the masses and the solution occurred in a poor manner. More specifically, at such higher temperatures, the solution is, in effect, projected outside of the region containing the masses and the active elements which the solution contains will then be deposited principally elsewhere than the masses.

It is known that in numerous cases where reactions occur in the presence of a mobile bed of granular masses, it is desirable to eliminate part of the heat stored by the masses during a process cycle. This is particularly true in the case of a process for fabricating chlorine from hydrogen chloride and/or ammonium chloride where, generally, a part of the masses is cooled.

This cooling is effectuated by continuously withdrawing from the top of the mobile bed at least a part of the granular masses which had previously been returned thereto. These withdrawn masses are then deflected toward a heat exchanger in which they flow under the influence of gravity parallel to the direction of travel of the masses forming the mobile bed within the reactors. The cooled masses are then returned to the hot masses leaving the reactors and the totality of the masses is returned to the top of the mobile bed.

The proportion of the masses which should be cooled to maintain the desired thermal equilibrium is determined particularly on the basis of the degree of exothermicity of the reaction cycle, the heat transfer coefficient of the masses, and the characteristics of the heat exchanger. In the case of a water cooler, it is suitable to continuously remove from the top of the bed between one-sixth and one-eighth of the masses which have been returned thereto, and to cool the withdrawn masses to around 100° C.

Advantageously, these withdrawn granular masses can be utilized to treat the chlorine current leaving the oxidation zone. It is known, in effect, that at temperatures of the order of 500° C. existing in the oxidation zone, the chlorine produced carries along toward the outside of the reactor an appreciable quantity of iron chloride, in particular, which eventually obstructs the gas outlet orifices owing to its condensation at those orifices. By constantly scavenging the exiting chlorine gases by a current of cooled granular masses of the type described above, the iron chloride is removed from the gas and this drawback is avoided.

BRIEF DESCRIPTION OF THE DRAWINGS

Fig. 1 is a simplified elevational view of a portion of one embodiment of a system for performing the method of the present invention.

FIG. 2 is a view similar to that of FIG. 1 of one system for performing the method according to the invention.

FIG. 3 is a view similar to that of FIG. 1 of another embodiment of a system for performing the method of the invention.

DESCRIPTION OF THE PREFERRED EMBODIMENTS

FIG. 1 of the drawings illustrates a particularly convenient manner of effectuating the previously-described treatment of the chlorinated gas, which treatment is also referred to as quenching. In the illustrated arrangement, the upper portion of the oxidation zone of a reaction vessel is provided with a peripherally extending collector 1 in the form of a recess formed in the wall of the vessel. The interior of this collector is in communication with a chlorine outlet conduit 2 inclined at an angle of 45° downwardly away from the vessel. Near the upper end of the conduit 2 there is connected a communicating delivery conduit 3 for delivering cooled granular masses to conduit 2. Conduit 3 is at right angles to conduit 2 and thus extends at a 45° angle upwardly from the wall of the reactor vessel. The cooled masses are thus delivered via conduit 3 into conduit 2 where they come into intimate contact with the chlorine current produced so as to assure the desired treatment of this current.

In the illustrated arrangement, the junction between the conduits 2 and 3 is located between an inner peripheral wall and an outer peripheral jacket of the vessel.

The replenishment according to the invention could be achieved in one manner with the arrangement illustrated in FIG. 3. This arrangement includes a metering rotating table 4 feeding cooled masses coming from a water cooler at a controlled rate, the device 4 being connected to the outlet of the cooler. These masses are delivered into the conduit 3, along which they travel to the vicinity of the collector 1. While flowing along conduit 3, the masses occupy only the bottom portion of that conduit so that it is possible to pour the replenishment solution onto these masses, without atomizing the solution, by introducing the solution through the free end 5 of the conduit 3. This mode of replenishment is very simple to carry out and it has been found in practice that it leads to a very satisfactory evaporation of the water contained in the solution. It is nevertheless preferable to utilize a conduit internally lined with bricks.

A second manner of replenishing the active ingredients of the masses utilizes the arrangement of FIG. 2 wherein the mixture of the masses and the chlorinated gas passes into a separator 6 whose roof is provided with atomizers 7 serving to deliver atomized replenishment solution onto the slopes of the mound formed by the masses below the atomizers. The locations of these slopes is illustrated by broken lines within separator 6. A scavenging gas current is introduced into the separator via a passage 8 at the bottom of the separator. The granular masses pass out of the separator via this passage 8 so that the scavenging gas flows in counter current to the masses in that passage. The granules leaving passage 8 return to a device for lifting them back to the top of the apparatus. The chlorinated gas and the water vapor within separator 6 are then carried along by this scavenging gas current out of the separator via passages 9. This mixture of gases is conveyed toward an installation which utilizes the chlorine, possibly after it first passes through a drying and/or concentrating system.

It is however desirable to utilize atomizers which are capable of withstanding humid chlorine. For this purpose, the atomizers could be made of titanium for example.

The aqueous solution utilized for effectuating the replenishment according to the invention contains one or several compounds of the usual active elements, particularly compounds of iron, manganese, magnesium, potassium, copper or cadmium. Possibily, these compounds are in the form of chlorides and are present in concentrations close to saturation at ambient temperatures in the range of 20–40° C. The respective concentrations of the active elements in this solution will be preferably selected in such a manner as to be proportional to the losses to be compensated.

These losses, determined with respect to the initial concentration, are expressed in practice in terms of kilograms of the active metallic element per hour of operation of the cycle. They are determined by analysis of samples of masses removed during a cycle of normal operation.

According to the invention, the flow rate of the replenishment solution is regulated as a function of its concentration in a manner such that the hourly quantity of active elements thus delivered to the cooled masses are at least equal to the quantity of active elements lost per hour by the totality of masses in circulation in the cycle.

In this manner, and due to the fact that the replenishment is effectuated continuously. the concentration of active elements in the totality of the granular masses always remains at least equal to the initial concentration established at the start of operation, although at any given instant only a fraction of the impoverished masses is treated. This fraction being constantly renewed, the entire process occurs as though the masses entered into the mobile bed with an excess of active elements at least equal to the quantities which they should lose during one passage through the reaction zones.

As a result of this replenishment, it has been found possible to maintain the efficiency of fixation of HCl and the concentration of the chlorine produced.

One exemplarly process accordinng to the invention was carried out utilizing the arrangement illustrated in FIG. 3. This arrangement was associated with a standard mobile bed capable of producing 15 tons of chlorine per day according to the process described in U.S. Pat. No. 3,332,742. Within this mobile bed, 30 tons of granular masses circulate at a rate of 15 tons per hour. These masses contain the following active elements.

Fe: 1.2 mol per kilogram of oxidized mass
Cu: 0.45 mol per kilogram of oxidized mass
K: 1.2 mol per kilogram of oxidized mass.

During the course of the process, the following losses were noted.

Fe: 261 kilograms per hour
Cu: 0.48 kilogram per hour
KCl: 0.99 kilogram per hour.

To maintain the thermal equilibrium of the cycle, masses were regularly removed from the top of the bed at a rate of 2500 kilograms per hour. These masses flow under the influence of gravity into a water cooler where their temperature is lowered to about 100° C. The cooled masses are then delivered to the vicinity of collector 1 to come in intimate contact with the chlorinated gas produced.

An aqueous solution is delivered at a constant rate of 17 liters per hour to the conduit 3 via opening 5. This solution has the following composition:

7.59 kilograms per hour of $FeCl_3$
1.02 kilograms per hour $CuCl_2$
0.99 kilogram per hour of KCl.

This composition corresponds to an enrichment of the cooled granules by:

0.019 mol of Fe per kilogram of oxidized mass
0.003 mol of Cu per kilogram of oxidized mass
0.005 mol of KCl per kilogram of oxidized mass.

It will be understood that the above description of the present invention is susceptible to various modifications, changes and adaptations, and the same are intended to be comprehended within the meaning and range of equivalents of the appended claims.

What is claimed is:

1. In a process for the production of chlorine from hydrogen chloride and/or ammonium chloride, including: causing granular masses, constituted by inert support material containing active ingredients constituted of compounds of iron, copper and potassium, for the process, to flow, under the influence of gravity, in a mobile bed through a plurality of superposed reaction zones to produce, in at least one such zone, chlorine which escapes from that zone in the form of a gas current, then returning such masses to the top of the mobile bed; continuously withdrawing, from the top of the bed, one part, constituting less than the entirety, of the masses delievered to the top of the bed; causing the withdrawn part to flow along a path outside the bed, from the top to the bottom of the bed; bringing the withdrawn part of the masses into contact with such chlorine-containing gas current leaving such reaction zone as that part travels along such path; combining the withdrawn part of the masses reaching the end of such path with the masses leaving the bottom of the bed; and returning the combined masses to the top of the bed, the improvement composed of a method for replenishing the active ingredients of the masses, comprising: cooling the withdrawn part of the granular masses at a point along such path to a temperature below 200° C.; delivering into contact with the cooled masses, when their temperature is below 200° C., and outside of the region where they are initially brought into contact with the gaseous current, an aqueous solution of the active ingredients; and maintaining the rate of delivery of such solution at a value which is a function of the concentration of the active ingredients therein for causing the quantity of active ingredients supplied by the solution per hour to be at least equal to the quantity of active ingredients lost per hour by totality of granular masses passing through the plurality of superposed reaction zones.

2. A process as defined in claim 1, wherein said step of delivering is carried out by pouring the solution of active ingredients onto the cooled masses before they enter into contact with the gaseous current.

3. A process as defined in claim 1, wherein said step of delivering is carried out by atomizing the solution and delivering the atomized solution onto the cooled masses in a separator which is disposed downstream, in the flow path of the withdrawn part of the masses, from the region of initial contact between the gaseous current and the cooled masses.

4. A process as defined in claim 1, wherein said step of withdrawing is carried out by withdrawing between one-eight and one-sixth of the masses delivered to the top of the bed and said step of cooling is carried out by passing the withdrawn part of the masses through a water cooler.

References Cited
UNITED STATES PATENTS

| | | | |
|---|---|---|---|
| 3,597,159 | 8/1971 | Nakaya et al. | 23—219 |
| 2,914,467 | 11/1959 | Cross | 252—412 X |
| 3,342,557 | 9/1967 | Metaizeau | 23—219 |
| 3,140,264 | 7/1964 | Oleck et al. | 252—412 |
| 2,842,503 | 7/1958 | D'Ouville et al. | 252—412 |

OSCAR R. VERTIZ, Primary Examiner
STEPHEN B. SHEAR, Assistant Examiner

U.S. Cl. X.R.
423—507